3,687,702
DUSTING METHOD AND APPARATUS
William E. Le May and Richard F. Glennon, Kettering, Ohio, assignors to Baxter Laboratories, Inc.,
Filed June 17, 1966, Ser. No. 558,507
Int. Cl. B05b 7/26; B44c 1/06
U.S. Cl. 117—16      13 Claims

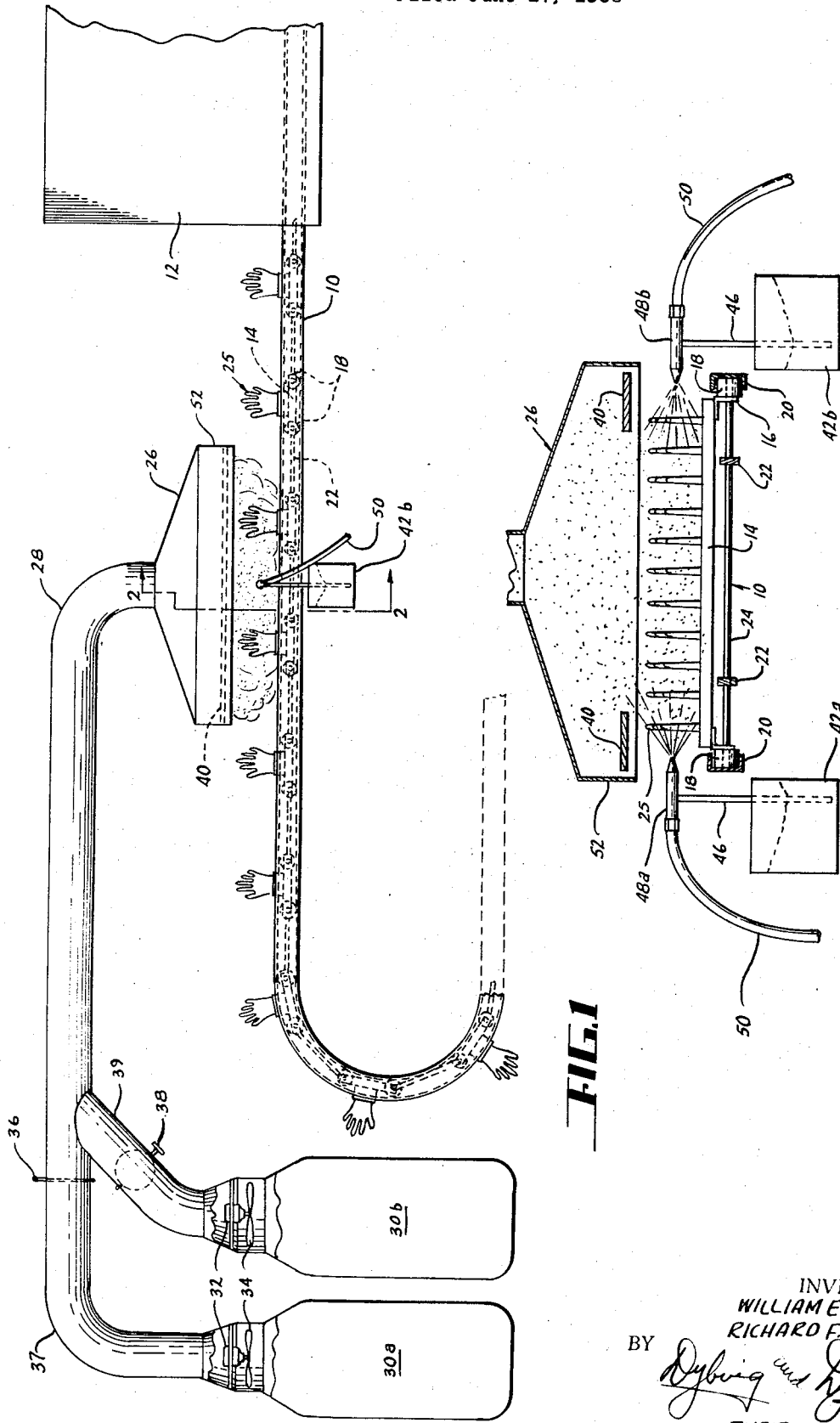

ABSTRACT OF THE DISCLOSURE

A method and apparatus for dusting a tacky object utilizes impeller means and guide means to move air upwardly at a predetermined velocity, and means for injecting small dust particles into the upward air draft to form a stationary cloud of dust particles supported by the draft. An object to be dusted, such as rubber gloves, is placed in the upward air draft and stationary cloud to be coated with a fine, uniform film of dust particles.

---

This invention relates to a method and apparatus for dusting and more particularly to a method and apparatus for dusting plastic or rubber films of irregular shape.

In the manufacture of various articles composed of plastic or rubber sheets or films, it has become a common practice to apply a layer of dust to the article promptly after the article has been formed. In some cases this layer of dust is applied merely to prevent blocking between the articles, should a number of articles be packaged together. In other cases, as with wearing apparel such as gloves, the dusting is used to facilitate donning of the article.

In the past, dusting has been accomplished by contacting the article to be dusted with an oversupply of the dust. Thus, balloons and other small items are typically dusted by tumbling the items in a container charged with the dusting agent so that, as the articles are tumbled, their surfaces come in contact with the dusting agent. With larger articles such as gloves, a typical procedure is to sprinkle the article as in the manner of salting foodstuffs, or to subject the article to a spray treatment in which the surfaces are exposed directly to a dusting spray.

A difficulty encountered with all of these prior techniques is that the article to be dusted is contacted with an oversupply of the dusting compound and, particularly when the article is of an irregular shape, thick deposits of the dusting compound accumulate in pockets or crevices of the article. Further when the article is itself of a tacky nature or the dusting compound has a tendency to absorb moisture, cakes of dust can accumulate on various parts of the article dusted. Such buildups of dust represent an unnecessary waste to the manufacturer and are objectionable to the ultimate user.

It has been found that, by means of a generally upward air flow, it is possible to support the dust against gravity and thereby establish a nearly motionless cloud of the dust moving slowly upwardly. Then, by advancing articles to be dusted through such cloud, it has been further found that the articles, even though irregular in shape, are uniformly coated over all with a thin and exceedingly uniform deposit of dust. By this technique, irregularly shaped articles can be coated without waste and without building up an oversupply of dust such as would produce undesirable pockets or cakes of dust.

It has been further found that by careful control of the temperature at which certain types of plastic or rubber having thermoplastic characteristics are dusted, a surface tackiness effective to anchor the dust to the article can be developed on the thermoplastic surface. With cruder dusting techniques such as surface tackiness is a disadvantage since it leads to an undesirable buildup and caking of the dust. However, with the herein disclosed dusting technique the undesirable buildup is eliminated and a surface tackiness is then desirable to anchor the film of dust to the article.

It is thus an object of the present invention to provide a new and improved dusting method.

Another object of the present invention is to provide a new and improved dusting apparatus.

Still another object of the present invention is to provide a new and improved method for dusting polyvinyl chloride films.

Other objects and advantages reside in the construction of parts, the combination thereof, the method of manufacture and the mode of operation, as will become more apparent from the following description.

In the drawing:

FIG. 1 is a fragmentary side elevation view, with a portion shown in phantom detail, illustrating a glove making apparatus including the present invention.

FIG. 2 is a fragmentary section view taken substantially along the line 2—2 of FIG. 1.

To facilitate description of the present invention, apparatus suitable for the practice of the invention is illustrated in the drawing in association with a machine for manufacturing gloves. The glove making machine comprises a conveyor 10 which passes horizontally through an elongated oven 12. Mounted on the conveyor are a plurality of elongated bars 14 engaged at their opposite ends by angle brackets 16 which rotatably support rollers 18. As can be seen in FIG. 1, two rollers 18 are supported in spaced relation by each bracket 16 at each end of each bar 14.

The rollers 18 are received between spaced flanges of channel members 20 which define tracks for the conveyor 10. The rollers 18, being spaced in pairs, prevent turning of the bars 14 about their own longitudinal axes.

Extending between the angle brackets 16 for each bar 14 and underlying each bar 14 is a rod 24. The rods 24 are interconnected by rigid links 22 pivotally engaging the rods. The links 22 maintain a fixed spacing between the several bars 14 and provide a driving connection between the bars so that the bars 14 can be driven in unison from a single power source.

Each bar 14 supports a plurality of glove forms spaced along the length of the bar. The glove forms, which have the approximate shape of the human hand, are positioned so that their palm portions are parallel to the direction of conveyor travel.

Only so much of the conveyor as is needed for a full description of the present invention has been included in the drawing. It will be understood by those skilled in the art of glove making that various operating stations to which the conveyor would ordinarily pass do not appear in the drawing. Thus the conveyor may pass through a station, not illustrated, in which the composition which produces the gloves is applied onto the glove forms. Then the conveyor 10 may pass through forming stations in which the orientation of the form with respect to the gravitational field is varied so as to cause a flow of the composition applied to the form so as to adjust the film thickness on various portions of the form. Ultimately, after the various operations desired to be performed in forming the glove are completed, the conveyor enters the oven 12 wherein the film supported on the glove form receives a heat treatment effective to fix or cure the film.

FIG. 1 illustrates the glove forms as they emerge from the oven and after the films thereon have been set or cured to substantially their final state. The gloves are essentially complete at this point and all that remains is to strip the gloves from their forms and, when desired, to trim or shape the cuff of the gloves. For various reasons, however, it is found desirable to dust the gloves before they are stripped from the forms. By dusting before stripping, a relatively uniform layer of dust can be applied to that side of the glove film which will represent the inside surface of the glove after stripping. Thus, the glove form is typically stripped by pulling the cuff portion of the glove over the finger portions in a manner which turns the glove inside out. It follows that, by uniformly dusting the exposed glove surface before stripping, the interior of the glove can be dusted without waste. As will be described hereinafter, it is then an easy matter, after stripping, to dust the newly exposed outer glove surfaces without waste.

By dusting before stripping, a further and unique advantage is obtained with certain types of film compositions, especially polyvinyl chloride compositions. Polyvinyl chloride films such as employed in glove making are typically produced from dispersions of polyvinyl chloride resin in a plastisizer, such dispersions being popularly referred to as plastisols. During heat treatment of the form to which the plastisol has been applied, a process known as solvation occurs in which the resin and the plastisizer unite as a homogenous mass forming a continuous self-supporting film on the form. The temperature at which the solvation takes place varies depending upon the precise nature of the resin and plastisizers used. However for most commercial preparations the solvation temperature is in the vicinity of 425° F.

Even after solvation is complete and the resulting film has thus become relatively self-supporting, the high temperature of solvation keeps the film in a tacky and relatively pliable state. If one were to attempt to dust the outer surface of the glove at or near the temperature of solvation the tackiness of the glove could cause the glove to capture an objectionally heavy deposit of dust.

It is therefore desirable in the manufacture of polyvinyl chloride gloves and related articles from plastisol solutions that a period of time be provided during which the glove forms and films supported thereby are permitted to cool below the solvation temperature after emerging from the oven. In the practice of the present invention, when applied to the dusting of polyvinyl chloride articles, the article is therefore permitted to cool to a surface temperature between 130° F. and 400° F.

For the dusting of gloves or other articles in accordance with the present invention, a hood 26 is supported above the conveyor 10 in a position spaced away from the outlet opening to the oven 12. The spacing between the oven 12 and the hood 26 is established empirically based upon the ambient air conditions so that the glove forms 25 being conveyed under the hood 26 will support plastisol films having the desired surface temperature.

The air under the hood is exhausted through a duct 28 communicating to filter bags 30*a* and 30*b*. The flow of air to the bag 30*a* is regulated by a baffle 36 located adjacent an elbow 37 communicating with the duct 28. The flow of air to the bag 30*b* is regulated by a baffle 38 located in a fork 39 also communicating with the duct 28.

Air is drawn through the duct 28 and forced into the bags 30*a* and 30*b* by means of impellers 34 driven by motors 32, there being one motor and impeller for each of the bags 30*a* and 30*b*.

The bags 30*a* and 30*b* are formed of a porous fabric such as employed for conventional vacuum cleaners so that the air moved by the impellers 34 can escape from the bag but dust carried by the air is trapped within the bags.

By employing at least two dust collection bags 30*a* and 30*b* it is possible to fill a first bag while the second bag remains idle, then switch to the second bag by adjustment of the baffles 36 and 38 to fill the second bag while the first bag is being emptied and replaced. While only two bags are illustrated, for the purposes of convenience, those skilled in the art will recognize that the system may include additional bags all connected to the duct 28 so that the average level to which all bags are filled with dust can remain substantially constant thus providing a substantially constant air flow through the duct 28, it being apparent that as one bag fills the air flow through such bag diminishes.

The hood 26 has generally the shape of a hollow tetrahedron from which depends a peripheral skirt 52. The skirt 52 provides a vertically extending annular wall which guides air flowing into the hood in a vertically upward direction. Since the skirt 52 will offer some frictional resistance to vertical air flow immediately adjacent its interior surface, the flow of air laterally under the skirt and into the hood is also somewhat impeded by the skirt. The result is that the preponderant air flow into the hood 26 is a vertical air flow into the central portion of the hood.

As air is being continually removed vertically from the hood 26 through the duct 28, dust is continuously injected into the region under the hood 26. In the disclosed embodiment dust is injected under the hood 26 by means of aspirator injector nozzles 48*a* and 48*b*, one located on each side of the conveyor 10 as shown in FIG. 2.

The dusting medium, which may be talc or cornstarch as examples, is stored in containers 42*a* and 42*b*, one for each of the guns 48*a* and 48*b*.

Air under pressure delivered to the aspirator nozzles through hoses 50 passes through a venturi throat within each nozzle in the customary fashion, so as to draw a vacuum in lines 46 depending from the nozzles into the storage containers. The dust, which is preferably in the micronic size range with the majority of particles being less than one-half micron, is thus drawn through the lines 46 into the nozzles and carried with the main air streams from the lines 50 into the region which is under the hood 26.

The major portion of the dust injected into the region under the hood 26 is swept into the upwardly moving air stream, drawn through the duct 28 into the filter bags 30*a* and 30*b*, and is reclaimed. A minor portion of the dust is lost because, due to its size and momentum on emerging from the injector nozzle, it strays from the updraft of air under the hood 26. Another, but still substantial, portion of the dust enters into a slowly moving suspension of dust particles under the hood.

The slow moving suspension results from a near balance between the upward force imparted to the dust particles by virtue of the upwardly flowing air under the hood and the downwardly directed gravitational force which acts on all the particles. This suspension plays the predominant role in the dusting apparatus of the present invention.

To assure that the suspension will spread uniformly under the base of the hood 26, baffles 40 are strategically placed across the base of the hood. The baffles, which are perpendicular to the direction of air flow from the injector nozzles, shield the injected dust from an abrupt upward air flow until the dust has penetrated horizontally under the hood a sufficient distance that a reasonable fraction of the injected dust will reach the central portion of the base of the hood and be there suspended.

The density of the dust suspension and thus the thickness of the dust film deposited is conveniently adjusted by adjusting the velocity of upward air flow into the hood 26. With greater upward air velocity, a greater proportion of the dust is removed from the static suspension. With a lesser air velocity, a greater proportion remains in suspension. With dust in the micronic range, upward air velocities in the range of 100 to 300 cubic feet per minute per square foot are found adequate to maintain a suspension of sufficient density to give a clearly visible dust deposit on articles such as the herein described gloves.

It has been previously mentioned that the practice of the present invention results in application of an exceedingly uniform dust deposit to the articles dusted. The mechanism by which this result is accomplished is not fully understood. Through experimentation it is known that a tackiness at the surface of the article being dusted promotes a heavier and more uniform dust coating. Thus, direct contact between the tacky surface of the article and the suspended dust helps to trap a surface layer of dust. Also it can be expected that movement of irregular shapes, such as glove shapes, through the static suspension will generate minor eddy currents effective to move the dust around and through irregular and partially shielded portions of the glove shapes, assuring adequate exposure of all surface portions of the glove shapes to the dust.

It is also known that when dust particles are agitated, electrostatic effects take place in which the dust particles become charged. This is particularly true when the dust is ejected from a metallic nozzle. While the present invention is in no way limited to the use of metallic forms supporting the articles being dusted, it is considered that when metallic supporting forms are used, such forms may provide electrically grounded objects to which the charged dust will be attracted. To the extent this phenomenon may occur, metallic supporting forms could be a further factor promoting formation of a uniformly distributed dust film on the articles supported by the forms.

As previously mentioned, it is preferred that polyvinyl chloride articles have a surface temperature, when dusted, between 130° F. and 400° F. The most suitable temperature within this range depends on the density of the dust suspension and the speed of the conveyor 10. At higher surface temperatures, the dust pick-up will be greater. Accordingly, with greater density in the dust suspension, the dusting temperature can be lower. Also, where a greater conveyor speed is desired, the polyvinyl chloride surface temperature can be increased to compensate for the shortened travel time of the articles through the dust suspension.

It will be noted that with the arrangement illustrated in FIG. 2, the extreme left and extreme right hand forms mounted on each bar 14 will pass directly through the dust stream injected from each of the nozzles 48a and 48b. These forms will thus receive impact from the dust injected. This direct impact offers certain advantages in the practice of the present invention.

One advantage is that the other glove forms on the bar 14 do not receive a direct impact from the spray nozzles and thus receive a uniform coating. A more important advantage is that, as successive bars 14 pass through the direct spray from the injector nozzles, the basic pattern of dust flow into the region under the hood is periodically broken up, thus assuring a uniform distribution of dust throughout the region under the hood 26. The result is that, even though the dust is injected under the hood from diametrically opposite sides and would tend to form a dust laden channel extending transversely under the hood, the periodic deflections of the dust sprays by the outermost glove forms assures that the dust will be scattered to all areas of the region under the hood 26.

If the nature of the article dusted or the customer requirements should dictate that the outermost forms on the bars 14 should not be exposed to the direct spray of the nozzles 48a and 48b, this condition is readily avoided. Thus protective shields, not shown, can be mounted at the outer ends of the bars 14 thereby providing the desirable periodic deflection of the injected dust stream without directly exposing the outermost forms to the dust stream. As a convenient alternative, a rotary baffle may be mounted adjacent the outlet end of each of the nozzles 48a and 48b and caused to periodically deflect the dust stream emerging from each spray nozzle. A still further alternative is to simply not apply a plastic or rubber film to the outermost forms, thereby using the outermost forms as dummy forms having the sole function of serving to intermittently deflect the dust spray into the region under the hood 26.

After the glove articles have been dusted on their supporting forms as described, the gloves are stripped from their forms so as to turn the gloves inside out, thus exposing the opposite glove surfaces, which are not yet dusted. The opposite surfaces are easily dusted without waste by re-exposing the gloves to the dust suspension above described, or, for convenience, to a separate suspension established in the same manner as the above described suspension.

For this second exposure it is desirable that the glove remain relatively warm and tacky. Accordingly, in the preferred practice of this invention, the gloves are promptly stripped after first dusting and then promptly re-exposed to a dust suspension to minimize cooling between the successive dustings.

The present invention has been described with primary emphasis on the production of polyvinyl chloride plastisol articles since these offer the particular benefit that with proper temperature control a desirable tackiness for anchoring the dust to the article is developed. It is not intended, however, by giving emphasis in this disclosure to the manufacture of polyvinyl chloride articles, to in any way limit the application of the present method and apparatus to the dusting of articles fabricated with other compositions.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. Apparatus for dusting a tacky object comprising impeller means to move the air, means to guide the air moved by said impeller means in a generally vertical direction to thereby form an upward air draft, a source of dust particles the majority of which are less than one micron in diameter, injector means to inject dust particles into said upward air draft, said injector means comprising means for providing an air stream directed transversely into said upward air draft, and means for injecting said dust particles into said air stream said draft having an upward velocity sufficient to form a generally stationary cloud of dust particles supported by said draft, support means supporting said object in said upward air draft to contact said object with said dust particles, and deflection means to periodically deflect said stream to disturb the pattern of dust flow into said upward air draft.

2. The apparatus of claim 1 wherein said support means comprises a form supporting said object and conveyor means to advance said form transversely through said upward air draft.

3. The apparatus of claim 1 wherein said injector means comprises means providing an air stream directed transversely to the direction of advance of said conveyor means into said upward air draft.

4. The apparatus of claim 1 including a hood through which said air is moved by said impeller means, said means to guide the air in a generally vertical direction comprising an annular vertically disposed skirt depending from said hood and defining an entrance to said hood for said air.

5. Apparatus for dusting an object comprising: a hood having an inlet opening at the bottom thereof and having an outlet opening disposed above said inlet opening, said hood having an annular, vertically disposed, depending skirt encircling said opening, conveyor means to convey said object transversely across said opening, said conveyor means moving said object horizontally below said hood below said skirt, injector means disposed outside said hood injecting dust particles the majority of which are less than one micron in diameter transversely into an area directly below said opening and skirt, and impeller means drawing air from said hood through said outlet opening whereby air flowing at a predetermined velocity into said hood from outside said hood suspends a portion of said dust below and outside said hood an carries a further portion of said dust into said hood through said inlet opening, and means for periodically deflecting the transverse air stream to periodically change the path of movement of said injected dust particles into said air flowing into said hood.

6. The apparatus of claim 5 wherein said injector means injects said dust in a direction transverse to the direction of conveyor movement.

7. The apparatus of claim 6 wherein said conveyor means supports said object at the elevation of said injector means in conveying said object across said opening whereby said object crosses the path of said injected dust.

8. The apparatus of claim 5 having baffles positioned perpendicular to the direction of air flow and located about the inner periphery of said skirt to shield said injected dust particles from said flowing air until the dust has penetrated under said hood a sufficient distance to be suspended under a center portion of the hood.

9. The method of dusting a tacky article comprising the steps of moving air upwardly at a predetermined velocity, injecting dust particles the majority of which are less than one micron in diameter into said air to form a generally stationary cloud of dust particles supported by said upwardly moving air, and supporting said article in said upwardly moving air.

10. The method of claim 9 including the steps of moving said article supported in said upwardly moving air transversely through said upwardly moving air.

11. The method of claim 9 wherein said dust particles are injected into said upwardly moving air by establishing an air stream directed transversely into said upwardly moving air and injecting said dust particles into said air stream, said method including the step of periodically deflecting said air stream to periodically change the path of movement of said dust particles into said upwardly moving air.

12. The method of dusting an article having thermoplastic characteristics, comprising the steps of heating the article to provide a tacky surface thereon, moving air upwardly at a predetermined velocity, injecting dust particles the majority of which are less than one micron in diameter into said upwardly moving air to form a generally stationary cloud of dust particles supported by said upwardly moving air, and supporting said heated article in said upwardly moving air.

13. The method of claim 12 including the step of moving said article supported in said upwardly moving air transversely through said upwardly moved air.

References Cited

UNITED STATES PATENTS

| 1,876,251 | 9/1932 | Lehman | 118—309 |
|---|---|---|---|
| 2,169,078 | 8/1939 | Waite | 117—31 |
| 2,642,033 | 6/1953 | Miller | 117—F.B. |
| 2,907,299 | 10/1959 | Weiner | 118—309 |
| 3,012,900 | 12/1961 | Kleinmann et al. | 118—309 |
| 3,291,630 | 12/1966 | Deyle et al. | 118—312 |

FOREIGN PATENTS

| 942,413 | 11/1963 | Great Britain | 117—33 |
|---|---|---|---|

WILLIAM D. MARTIN, Primary Examiner

W. R. TRENOR, Assistant Examiner

U.S. Cl. X.R.

117—18; 118—308, 309, 310, 312